US008442050B2

(12) United States Patent
Kim et al.

(10) Patent No.: US 8,442,050 B2
(45) Date of Patent: May 14, 2013

(54) APPARATUS AND METHOD OF CONTROLLING LSP OF RSVP-TE PROTOCOL USING LABEL WITH AVAILABILITY OF END-TO-END RANGE

(75) Inventors: Sun Me Kim, Daejeon (KR); Eun Young Cho, Daejeon (KR); Ho Young Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 278 days.

(21) Appl. No.: 12/828,659

(22) Filed: Jul. 1, 2010

(65) Prior Publication Data

US 2011/0090913 A1   Apr. 21, 2011

(30) Foreign Application Priority Data

Oct. 16, 2009   (KR) ........................ 10-2009-0098945

(51) Int. Cl.
*H04L 12/28* (2006.01)
(52) U.S. Cl.
USPC ............................ 370/392; 370/469; 370/401
(58) Field of Classification Search ........................ None
See application file for complete search history.

(56) References Cited

U.S. PATENT DOCUMENTS

| 8,165,032 B1* | 4/2012 | Hanif et al. ................... 370/248 |
| 2009/0207845 A1* | 8/2009 | Guan ............................ 370/392 |
| 2011/0199891 A1* | 8/2011 | Chen ............................ 370/218 |

OTHER PUBLICATIONS

Aslam, Faisal et al., "Interdomain Path Computation: Challenges and Solutions for Label Switched Networks," IEEE Communications Magazine, vol. 45(10):94-101 (2007).
Awduche, D. et al., "RSVP-TE: Extensions to RSVP for LSP Tunnels," Network Working Group, Request for Commnets: 3209, Catetory: Standards Track, 61 pages, (2001).
Berger, L. et al., "Generalized Multi-Protocol Label Switching (GMPLS) Signaling Functional Description," Network Working Group, Request for Comments: 3471, Category: Standards Track, 34 pages, (2003).
Berger, L. et al., "Generalized Multi-Protocol Label Switching (GMPLS) Signaling Resource ReserVation Protocol-Traffic Engineering (RSVP-TE) Extensions," Network Working Group, Request for Comments: 3473, Category: Standards Track, 42 pages, (2003).

* cited by examiner

*Primary Examiner* — Duc C Ho
(74) *Attorney, Agent, or Firm* — Nelson Mullins Riley & Scarborough LLP; EuiHoon Lee, Esq.

(57) ABSTRACT

Provided are a method and apparatus of controlling a Label Switched Path (LSP) of a Resource Reservation Protocol-Traffic Engineering (RSVP-TE) protocol, which may define an available label in an End-to-End range when a label is not changed by transit nodes, and is determined only by an external management system or a manager, or an ingress node or an egress node, thereby more simply and effectively operating the RSVP-TE protocol, and removing limitations in functions of nodes such as path calculating.

16 Claims, 6 Drawing Sheets

APPARATUS AND METHOD OF CONTROLLING LSP OF RSVP-TE PROTOCOL USING LABEL WITH AVAILABILITY OF END-TO-END RANGE

CROSS-REFERENCE TO RELATED APPLICATION

This application claims the benefit of Korean Patent Application No. 10-2009-0098945, filed on Oct. 16, 2009, in the Korean Intellectual Property Office, the disclosure of which is incorporated herein by reference.

BACKGROUND

1. Field of the Invention

Embodiments of the present invention relate to a technique of processing a value of label, in a controlling process of a Label Switched Path (LSP), using a Resource Reservation Protocol-Traffic Engineering (RSVP-TE) protocol.

2. Description of the Related Art

A Resource Reservation Protocol-Traffic Engineering (RSVP-TE) protocol may be a standard of which standardization is advancing in an Institution of Electronics and Telecommunication Engineers (IETF), and may be a protocol for managing designation/release of a Label Switched Path (LSP) of an optic layer in an Internet Protocol (IP) transmission scheme, an asynchronous transfer mode (ATM) transmission scheme, and Ethernet.

The LSP may have a label, that is, a value used for uniquely identifying and transmitting the LSP. As an object within the RSVP-TE protocol for assigning and managing the label of the LSP, a label object, a generalized label object, a suggested label object, an upstream label object, and the like have been suggested.

FIG. 1 illustrates an example of a method for controlling an LSP using an RSVP-TE protocol according to a conventional art.

Referring to FIG. 1, the label object and the generalized label object may be RSVP-TE objects for assigning a label of the LSP in a downstream direction from an ingress node to an egress node, and may be operated in a general procedure as illustrated in FIG. 1.

In operation 101, a management plane may request designation of an LSP from an ingress node (A) to an egress node (D).

In operation 102, the ingress node (A) may calculate a next hop for reaching the egress node (D) to thereby obtain information about a transit node (B). The ingress node (A) may generate an RSVP-TE Path message to transmit the transit node (B). In this instance, in operation 103, the ingress node (A) may add a label request or a generalized label request to the RSVP-TE Path message to thereby transmit information about a switching type, an encoding type, and a payload type of a requested LSP.

In operation 104, the transit node (B) may receive the RSVP-TE Path message, calculate a next hop for reaching the egress node (D), and generate a new RSVP-TE Path message to thereby transmit the generated RSVP-TE Path message to a transit node (C), that is, the calculated next hop, in operation 105. The above described operations performed in the transit node (B) may be performed in the transit node (C) in the same manner.

Finally, in operation 108, when the egress node (D) receives the RSVP-TE Path message, the egress node (D) may assign an LSP-1 of an acceptable label and being suitable for contents (switching type, encoding type, and payload type) of a label request or a generalized label request, which are requested by the transit node (C) in an interface with the transit node (C). Next, in operation 109, the egress node (D) may designate related information using label information of the assigned LSP-1, so that data is received in a forwarding table of a data plane of the egress node (D). Also, in operation 110, the egress node (D) may generate an RSVP-TE Resv message, and apply, to the generated RSVP-TE Resv message, a value (LSP-1) of the label assigned to the label object or the generalized label object to thereby transmit the RSVP-TE Resv message to the transit node (C).

In operation 111, the transit node (C) receiving the RSVP-TE Resv message may designate that data using a value of a corresponding label is transmitted to a forwarding table of a data plane of the transit node (C) in accordance with the applied value (LSP-1) of the label. Next, the transit node (C) may assign a value (LSP-2) of an available label in a connection interface with the transit node (B) of a previous node. Also, in operation 113, the transit node (C) may designate that the value (LSP-2) of the assigned label is received to a forwarding table of a data plane of the transmit node (C), and also designate that data received as the LSP-2 label is switched into the LSP-1 to be transmitted. In operations 114, the transit node (C) may apply, to the label object or generalized label object of the RSVP-TE Resv message, the value (LSP-2) of the assigned label to thereby transmit the value (LSP-2) to the transit node (B). In operations 115, 116, and 117, the transit node (B) may receive the RSVP-TE Resv message, and perform the same operations as the above described operations of the transit node (C).

In operation 119, the ingress node (A) may finally receive the RSVP-TE Resv message, and control forwarding information of a data plane of the ingress node (A), so that data of a user is transmitted to an interface with the transit node (B) through the LSP, using a value (LSP-3) of a label transmitted to the label object or the generalized label object.

In this manner, the label object or the generalized object may be operated such that a downstream node may be assigned to the label object or the generalized object in an interface unit in hop-by-hop among all nodes constituting a single LSP.

As for values of labels of these objects, in a process of designating an LSP from an ingress node to an egress node while passing through transit nodes, each node may assign, in a hop-by-hop unit, a value of the label to an interface up to a next node. Each node may assign a value of the label to an interface up to a next node since the value of the label is a unique value within an interface of each node, and is not required to be a unique to the entire network.

However, a value of a label for identifying an LSP and transmitting data in a data transmission technique such as an IEEE 802.1Qay Provider Backbone Bridging-Traffic Engineering (PBB-TE) may be a unique value in an End-to-End range, may be determined only by an ingress node or an egress node of the LSP, or may be determined by a management plane. Accordingly, there is a need for effectively transmitting, to transit nodes, a value of a label assigned by the ingress node, the egress node, or the management plane to thereby control the transmitted value, however, the above described objects may be available objects in hop-by-hop, failing to provide the above described function.

To overcome the above problem, a method using a label Explicit Route Object (ERO) sub-object included in an ERO may be currently used. This method may be performed such that an ingress node designates all transit nodes one by one, where an LSP passes through, as a value such as a label ERO intended to be used in each transit node, using the ERO.

FIG. 2 illustrates an example of a method of controlling an LSP using a PBB-TE protocol according to a prior art.

Referring to FIG. 2, the PBB-TE protocol may use the ERO to designate an LSP from an ingress node (A) to an egress node (D). To apply label information to the ERO, a strict type of LSP may be required, and thereby the ingress node (A) may be required to have a function of performing a full route calculation for the LSP prior to a signaling process, in operation 202. In operation 203, the ingress node (A) may generate the ERO when the full route calculation is performed, and may simultaneously describe a value of an identical label while describing each hop of the ERO. That is, as for description of a hop, Internet Protocol version 4 (IPv4) sub-object and Internet Protocol version 6 (IPv6) sub-object each designating a specific node, and an interface sub-object designating an interface within each node are described, and a value of a label intended to be used in each hop may be repeatedly described. The method of controlling the LSP of FIG. 2 may be similar to that in FIG. 1 and thus, detailed descriptions thereof will be omitted.

As illustrated in drawings, the method of controlling the LSP using the PBB-TE protocol may need to perform the full route calculation using a path calculation engine in interior or exterior before performing an RSVP-TE signaling. Also, the ERO may be received in a single IP packet due to a relatively small size of the ERO, however, this may be impossible when a number of nodes constituting the LSP increases. Also, applying of an identical value may be inefficient method.

SUMMARY

An aspect of the present invention provides a method and apparatus of controlling a Label Switched Path (LSP) of a Resource Reservation Protocol-Traffic Engineering (RSVP-TE) protocol, which may define, in the RSVP-TE protocol, a label/generalized label object, a suggested label object, and an upstream label object each having availability of an End-to-End range, whereby designation of the LSP may be effectively controlled when labels of the End-to-End range are required to be the same, and transit nodes do not determine values of the labels.

According to an aspect of the present invention, there is provided an apparatus of controlling an LSP of an RSVP-TE protocol, the apparatus including: a next hop calculating unit to calculate a first next hop, a Path message generating unit to generate an RSVP-TE Path message including an egress node, and an Paths message transmission unit to transmit, to a next node associated with the calculated first next hop, the generated RSVP-TE Path message.

Also, the apparatus may further include an ingress label suggesting unit to suggest, to a suggested label object where an available C-type of End-to-End range is designated, a suggested label associated with a downstream LSP.

Also, the ingress label assigning unit to assign, to an upstream label object where an available C-type of an End-to-End range is designated, an upstream label associated with an upstream LSP.

According to an aspect of the present invention, there is provided an apparatus of controlling an LSP of an RSVP-TE protocol, the apparatus comprising: an egress message receiving unit to receive an RSVP-TE Path message transmitted from an ingress node through a next node, an egress label assigning unit to assign a label based on the received RSVP-TE Path message, and an Resv message transmission unit to transmit, to the ingress node through the next node, an RSVP-TE Resv message including the assigned label.

Also, the apparatus may further include an egress label designating unit to designate a suggested label in a forwarding table of a data plane associated with a downstream LSP, when the suggested label is acceptable, the suggested label being included in the received RSVP-TE Path message.

Also, the apparatus may further include an egress label designating unit to designate an upstream label in a forwarding table of a data plane associated with an upstream LSP, when the upstream label is acceptable, the upstream label being included in the received RSVP-TE Path message.

In this instance, the egress label assigning unit assigns the label based on a switching type, an encoding type, or a payload type in accordance with a generalized label request, and assigns the assigned label to a generalized label object having an available C-type of an End-to-End range.

Additional aspects, features, and/or advantages of the invention will be set forth in part in the description which follows and, in part, will be apparent from the description, or may be learned by practice of the invention.

EFFECT

According to embodiments of the present invention, a label of an End-to-End range may be not changed and the label may be required to be determined only by an external management system/manager an ingress node or an egress node, whereby transit nodes may recognize and control information about the label.

Also, according to embodiments of the present invention, limitations of a conventional art where an ingress node is required to designate all transit nodes where a Label Switched Path (LSP) passes through using an Explicit Route Object (ERO) may be overcome, and a repeated label ERO for each of the transit nodes may be designated, thereby solving a problem in that a length of a Resource Reservation Protocol-Traffic Engineering (RSVP-TE) Path message where an Internet Protocol (IP) fragmentation is impossible increases.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
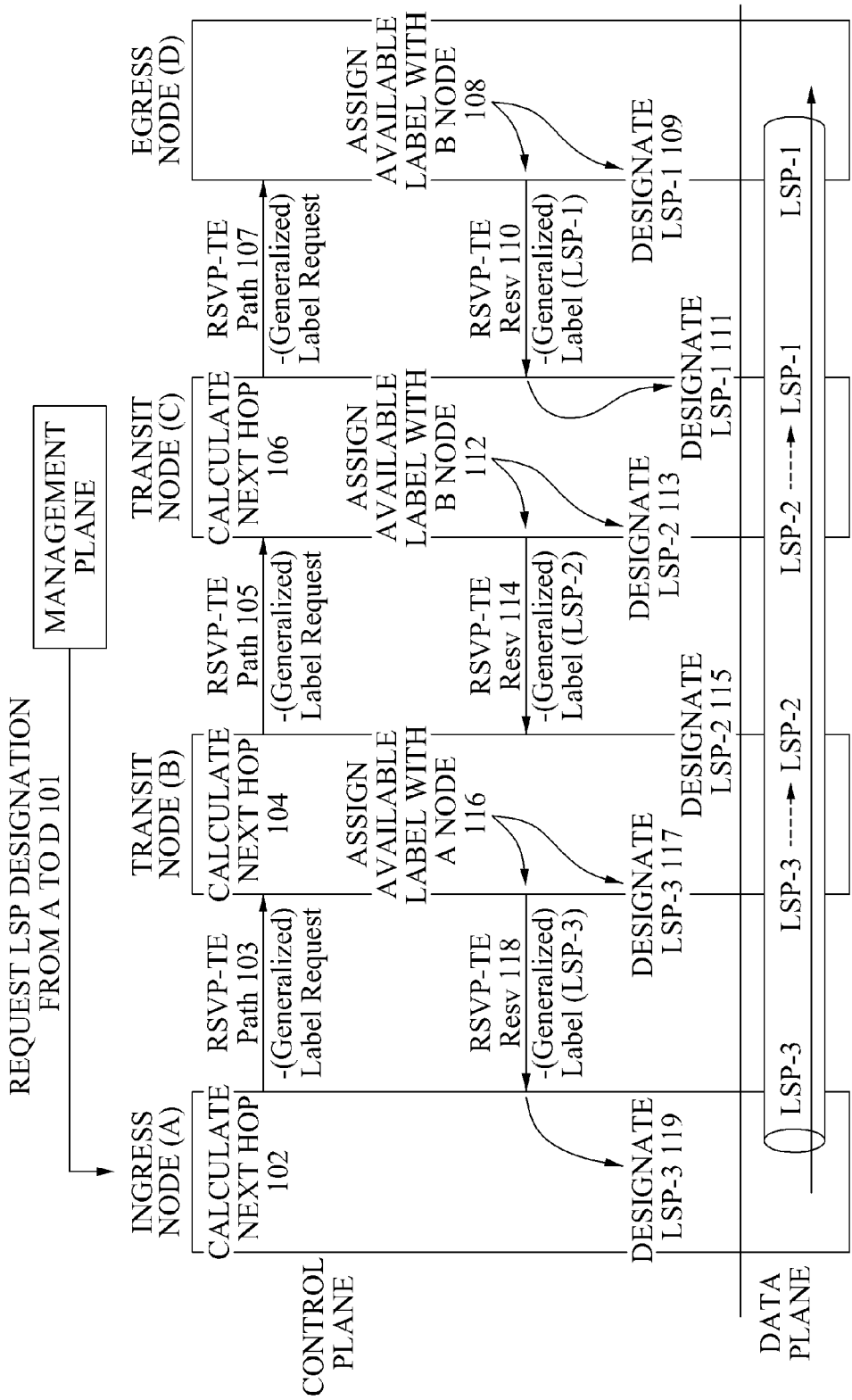
FIG. 1 illustrates an example of a method for controlling a Label Switched Path (LSP) using a Resource Reservation Protocol-Traffic Engineering (RSVP-TE) protocol according to a conventional art.
Figure 2:
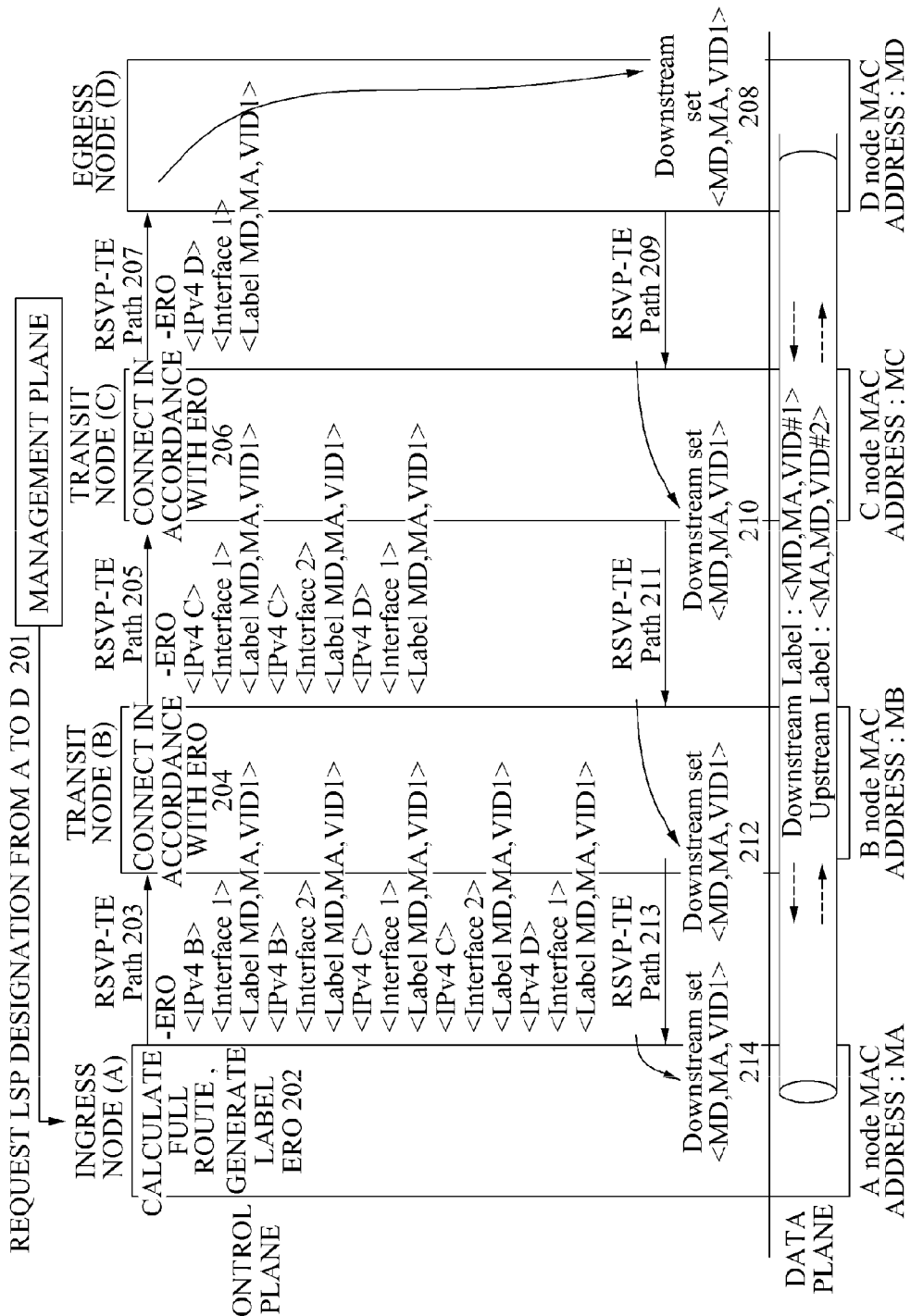
FIG. 2 illustrates an example of a method of controlling an LSP using a PBB-TE protocol according to a conventional art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A next node, a second next node, and a previous node of embodiments may be nodes existing between an ingress node and an egress node, and all may designate a transit node. Also, in the accompanying drawings, a method of controlling a Label Switched Path (LSP) within a Resource Reservation Protocol-Traffic Engineering (RSVP-TE) protocol of n=4 (n being a natural number) is described, however, according to exemplary embodiments, n may be greater or less than '4'. For example, in a case of n=4, the ingress node may be '1(n−3)', the next node may be '2(n−2)', the second next node or the previous node may be '3(n−1)', and the egress node may be '4(n)'.

Figure 3:
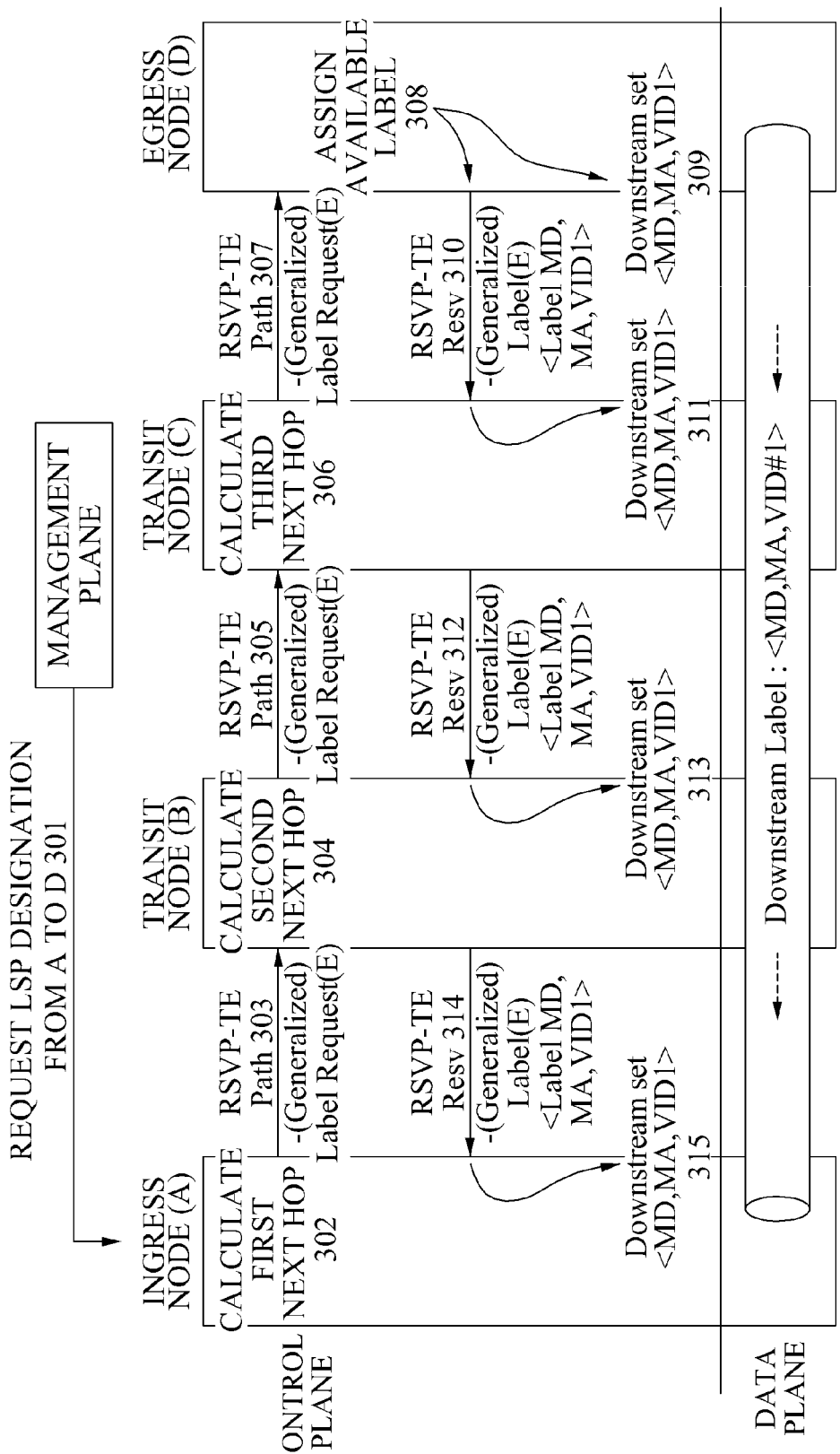
FIG. 3 is a flowchart illustrating a method of controlling an LSP of an RSVP-TE protocol using a (generalized) label object according to an embodiment of the present invention.

FIG. 3 is a flowchart illustrating a method of controlling an LSP of an RSVP-TE protocol using a (generalized) label object according to an embodiment of the present invention.

Referring to FIG. 3, the method may perform a process for assigning, in the ingress node, a label of the LSP in a downstream direction, that is, a direction of the egress node using a label object or a generalized label object.

In operation 301, a management plane may request designation of an LSP from the ingress node (A) to the egress node (B).

In operation 302, the ingress node (A) may calculate a first next hop. The ingress node (A) may calculate the first next hop to transmit an RSVP-TE Path message to the next node (B) and to obtain information about the next node (B). That is, the ingress node (A) may not calculate a full route up to the egress node (D), and calculate the first next hop up to the next node (B).

In operation 303, the ingress node (A) may generate the RSVP-TE Path message including the egress node (D), and transmit the generated RSVP-TE Path message together with a (generalized) label request of a C-type having availability of an End-to-End range. In this instance, the ingress node (A) may enable a (generalized) label request object including a switching type, an encoding type, and a payload type of a requested LSP to be included in the RSVP-TE Path message, and transmit the RSVP-TE Path message to the egress node (D).

In operation 304, the next node (B) may receive the RSVP-TE Path message, and may calculate a second next hop to obtain information about a second next node (C). In operation 305, the next node (B) may transmit the received RSVP-TE Path message as is to the second next node (C) obtained from the second next hop.

In operation 306, the second next node (C) may receive the RSVP-TE Path message, and calculate a third next hop to obtain information about the egress node (D). In operation 307, the second next node (C) may transmit the received RSVP-TE Path message as is to the egress node (D) obtained from the third next hop.

In operation 308, the egress node (D) may receive the RSVP-TE Path message, and assign an acceptable label (<label MD, MA, VID1>) based on the switching type, the encoding type, and the payload type included in the received RSVP-TE Path message. Next, in operation 309, the egress node (D) may designate, in a forwarding table of a data plane of the egress node (D), the assigned label as a downstream label (Downstream <MD, MA, VID1>). Also, in operation 310, the egress node (D) may generate an RSVP-TE Resv message, and enable the designated downstream label (Downstream <MD, MA, VID1>) to be included in the label object of the available C-type of the End-to-End range or the generalized label object, to thereby transmit the RSVP-TE Resv message to the previous node (C).

The previous node (C) may be a node transmitting the RSVP-TE Path message to the egress node (D), and may here designate the second next node (C). The second next node (C) may receive the RSVP-TE Resv message, and designate, in a forwarding table of a data plane of the second next node (C) a downstream label of an available C-type of an End-to-End range included in the RSVP-TE Resv message. In operation 312, the second next node (C) may transmit, to the next node (B) of a previous node, the RSVP-TE Resv message.

In operation 313, the next node (B) may receive the RSVP-TE Resv message, and designate, in a forwarding table of a data plane of the next node (B), the downstream label included in the RSVP-TE Resv message. Next, in operation 314, the previous node (C) may transmit, to the ingress node (A) of a previous node, the RSVP-TE Resv message.

In operation 315, the ingress node (A) may receive the RSVP-TE Resv message, and designate, in a forwarding table of a data plane of the ingress node (A), using the downstream label (<Label MD, MA, VID1>) transmitted to the label object of the C-type of the End-to-End range or the generalized label object, so that data of a user may be transmitted to an interface of the next node (B) through the LSP.

Figure 4:
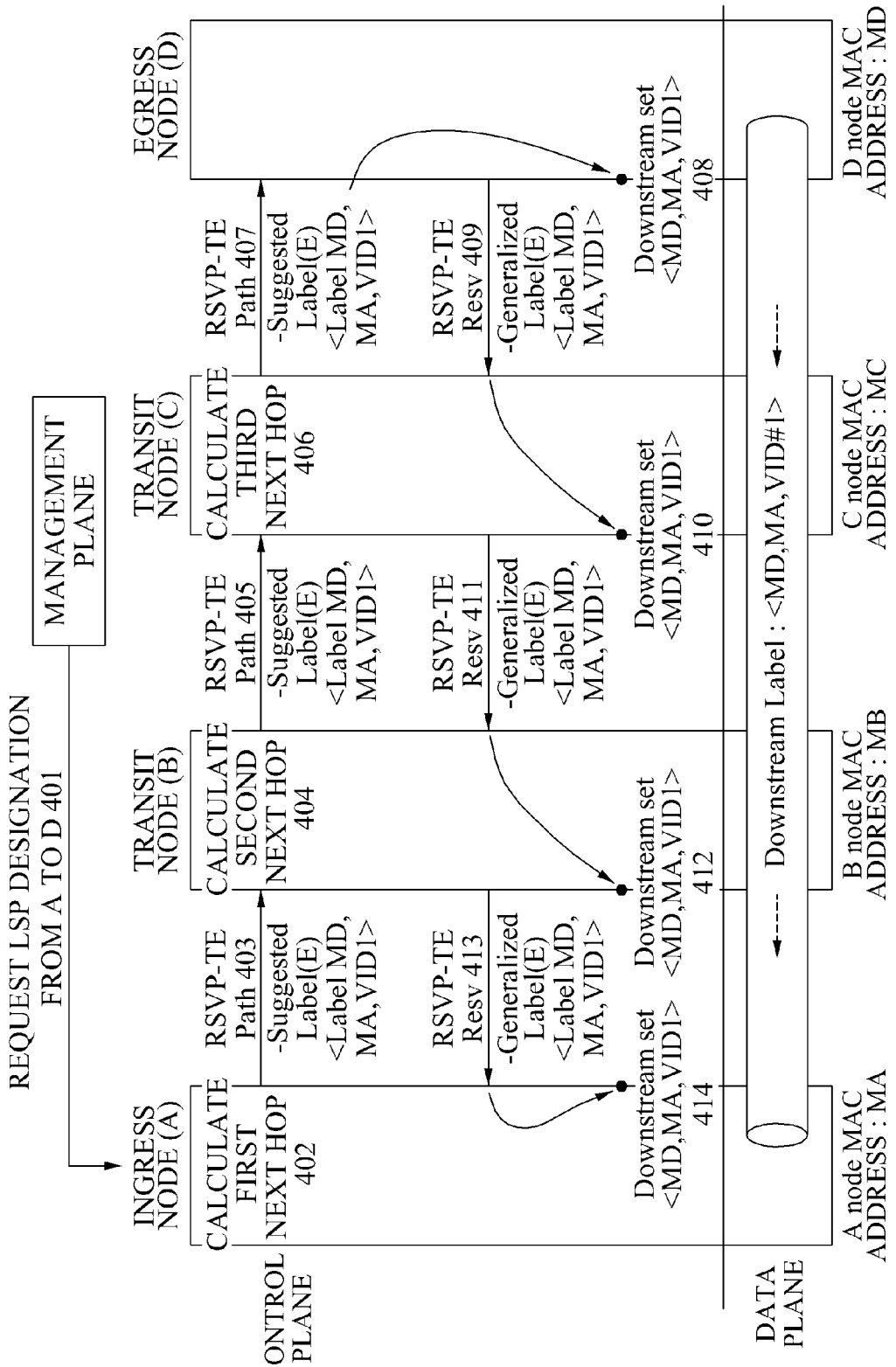
FIG. 4 is a flowchart illustrating a method of controlling an LSP of an RSVP-TE protocol using a suggested label object according to an embodiment of the present invention.

FIG. 4 is a flowchart illustrating a method of controlling an LSP of an RSVP-TE protocol using a suggested label object according to an embodiment of the present invention.

Referring to FIG. 4, it may be a principle that a label is assigned from a downstream node to an upstream node, however, the method of controlling the LSP of the RSVP-TE protocol may perform a method of suggesting a label desired to be assigned from the upstream node to the downstream node using a suggested label object, as illustrated in FIG. 4.

In operation 401, a management plane may request designation of an LSP from an ingress node (A) to an egress node (D).

In operation 402, the ingress node (A) may calculate a first next hop for obtaining a next node (B). In operation 403, the ingress node (A) may generate an RSVP-TE Path message intended to be transmitted to the next node (B), and transmit, to the next node (B) obtained from the first next hop, the generated RSVP-TE Path message through a 'suggested label object'. In this instance, the ingress node (A) may designate, in a suggested label object where an available C-type of an End-to-End range is designated, a suggested label (suggested label <Label MD, MA, VID1>) for a downstream LSP.

In operation 404, the next node (B) may receive the RSVP-TE Path message, and calculate a second next hop up to a second next node (C). In this instance, the next node (B) may use the suggest label (suggested label <Label MD, MA, VID1>) as is when the RSVP-TE Path message is the suggested label object of the available C-type of the End-to-End range. That is, in operation 405, the next node (B) may transmit, to the second next node (C), the received RSVP-TE Path message as is.

In operation 406, the next second node (C) may receive the RSVP-TE Path message, and calculate a third next hop up to the egress node (D). In operation 407, when the RSVP-TE Path message is the suggested label object of the available C-type of the End-to-End range, the second next node (C) may transmit, to the egress node (D), the received RSVP-TE Path message as is, in the same manner as that in the next node (C).

In operation 408, the egress node (D) may receive the RSVP-TE Path message, and may generate an RSVP-TE Resv message including a (generalized) label object as a downstream label (Downstream <MD, MA, VID1>) when the suggested label is acceptable. Also, the egress node (D) may designate, in a forwarding table of a data plane for a downstream LSP, the downstream label (Downstream <MD, MA, VID1>). Also, in operation 409, the egress node (D) may transmit, to a previous node (C), the generated RSVP-TE Resv message.

In operation 410, the previous node (C) may receive the RSVP-TE Resv message, and designate, in a forwarding table of a data plane of the previous node (C), the downstream label included in the RSVP-TE Resv message. In operation 411, the previous node (C) may transmit, to the next node (B) of the previous node, the RSVP-TE Resv message.

In operation 412, the next node (B) may receive the RSVP-TE Resv message, and designate, in a forwarding table of a data plane of the next node (B), the downstream label in the RSVP-TE Resv message. In operation 413, the previous node (C) may transmit, to the ingress node (A) of the previous node, the RSVP-TE Resv message.

In operation 414, the ingress node (A) may receive the RSVP-TE Resv message, and designate, in a forwarding table of a data plane of the ingress node (A), the downstream label.

Figure 5:
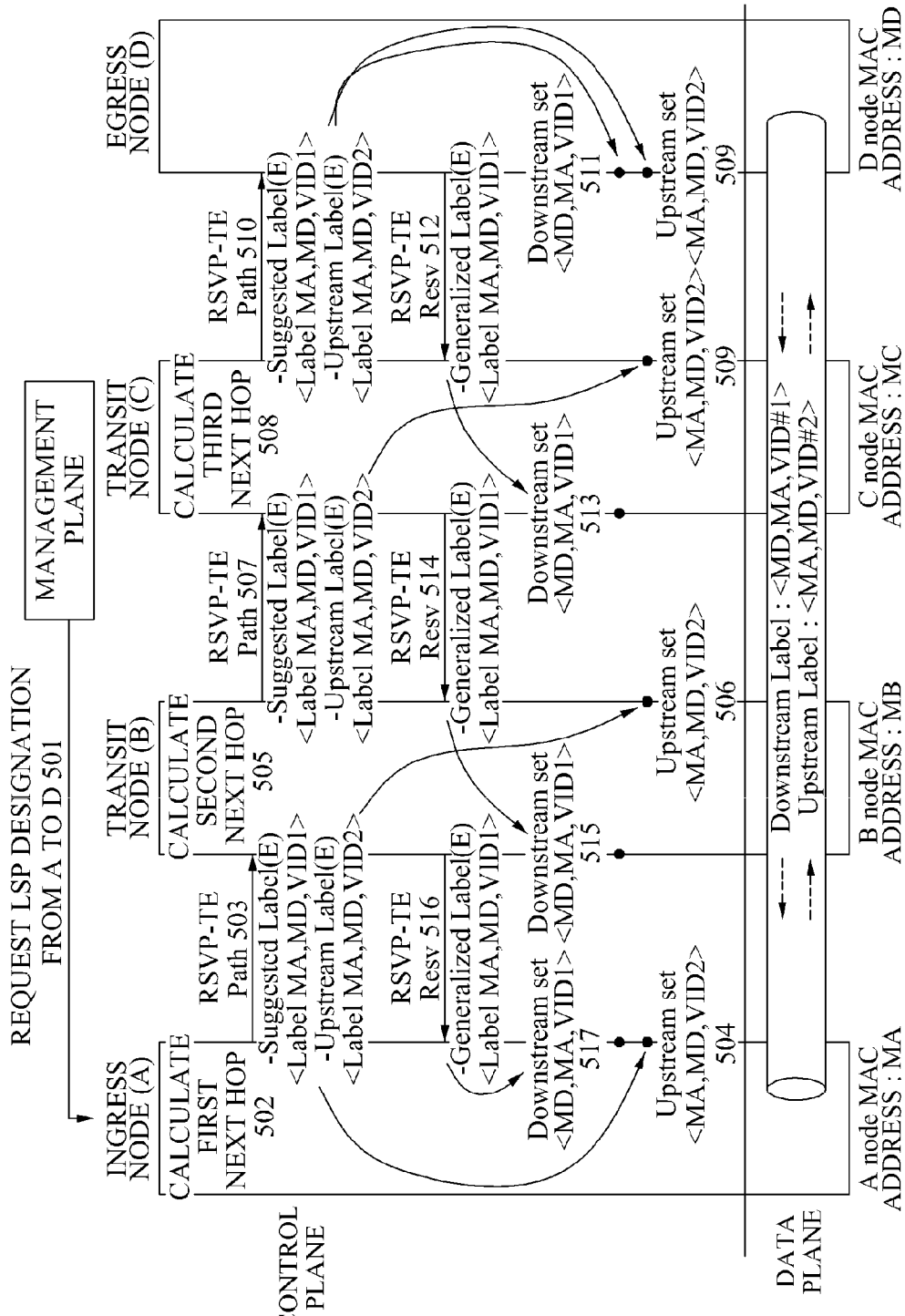
FIG. 5 is a flowchart illustrating a method of controlling an LSP of an RSVP-TE protocol using an upstream label object according to an embodiment of the present invention.

FIG. 5 is a flowchart illustrating a method of controlling an LSP of an RSVP-TE protocol using an upstream label object according to an embodiment of the present invention.

Referring to FIG. 5, designation of the LSP of the RSVP-TE protocol may be processed in a single-direction. That is, through a single path and message transmission/reception of an Resv message one time, the LSP from an ingress node (A) to an egress node (D) may be designated. When also desiring to designate a path from the egress node (D) to the ingress node (A), that is, in an opposite direction, another path and transmission/reception of the Resv message may be required to be performed in an opposite direction. Accordingly, when desiring to designate a bidirectional LSP, that is, when desiring to designate the bidirectional LSP between the ingress node (A) and the egress node (D) through the single path and the transmission/reception of the Resv message one time, the method of controlling the LSP of the RSVP-TE protocol may perform a general process, as illustrated in FIG. 5, through a suggested label object and an upstream label object.

In operation 501, a management plane may request designation of an LSP from the ingress node (A) to the egress node (D).

In operation 502, the ingress node (A) may calculate a first next hop for obtaining a next node (B). In this instance, to process the bidirectional LSP, the ingress node (A) may generate an RSVP-TE Path message including an upstream label object where an available C-type of an End-to-End range is designated, with respect to an upstream direction, together with a suggested label object where an available C-type of an End-to-End range is designated.

For example, the ingress node (A) may designate, in the suggested label object where the available C-type of the End-to-End range is designated, a suggested label (Suggested Label <Label MD, MA, VID1>) for the downstream LSP, and at the same time, may assign, to the upstream label object where the available C-type of the End-to-End range is designated, an upstream label (Upstream Label <Label, MA, MD, VID2>) for the upstream LSP. In operation 504, the ingress node (A) may designate, in a data plane of the ingress node (A), the assigned upstream label (Upstream Label <Label, MA, MD, VID2>) with respect to the upstream direction.

In operation 503, the ingress node (A) may enable the upstream label object including the designated upstream label (Upstream Label <Label, MA, MD, VID2>) and the suggested label object including the suggested label (Suggested Label <Label MD, MA, VID1>) to be included in the RSVP-TE Path message, and transmit the RSVP-TE Path message to the next node (B) obtained from the calculated first next hop.

In operation 505, the next node (B) may receive the RSVP-TE Path message, and calculate a second next hop up to a second next node (C). In this instance, the next node (B) may use the suggested label (Suggested Label <Label MD, MA, VID1>) and the upstream label (Upstream Label <Label, MA, MD, VID2>) as are, when the received RSVP-TE Path message is a suggested label object or an upstream label object each of an available C-type of an End-to-End range.

That is, the next node (B) may designate, in a data plane of the next node (B), that the upstream label (Upstream Label <Label, MA, MD, VID2>) is used with respect to data reaching the ingress node (A). Also, in operation 507, the next node (B) may transmit, to a second next node (C), the RSVP-TE Path message including the suggested label and the upstream label as they are.

In operations 508, 509, and 510, the same procedure as in the next node (B) may be performed in the second next node (C).

In operation 509, the egress node (D) may receive the RSVP-TE Path message, and designate, in a data table of a data plane of the egress node (D), the upstream label (Upstream Label <Label, MA, MD, VID2>), when the upstream label included in the RSVP-TE Path message, is acceptable. When the upstream label is not acceptable, the egress node (D) may report an error, and process the designation of the LSP as a failure.

In operation 511, when the suggested label is acceptable, the egress node (D) may designate, in a forwarding table of a data plane of the egress node (D), the suggested label as a downstream label (Downstream <MD, MA, VID1>). In operation 512, the egress node (D) may enable the downstream label to be included in a generalized label object of an RSVP-TE Resv message in response to the received RSVP-TE Path message, and transmit, to the previous node (C), the RSVP-TE Resv message.

Next, a procedure of processing the RSVP-TE Resv message in the previous node (C), the next node (B), and the ingress node (A) may be the same as that in FIG. 4, and thus detailed descriptions thereof will be herein omitted.

As described above, the method of controlling the LSP of the RSVP-TE protocol according to exemplary embodiments may define an available label in an End-to-End range, so that the label is a unique in the End-to-End range, is not changed by transit nodes, and is determined only by an external management system and a manager, or an ingress node or an egress node of the LSP, thereby more simply and effectively operating the RSVP-TE protocol, and removing limitations in functions of nodes such as path calculation.

The method of controlling the LSP of the RSVP-TE protocol according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
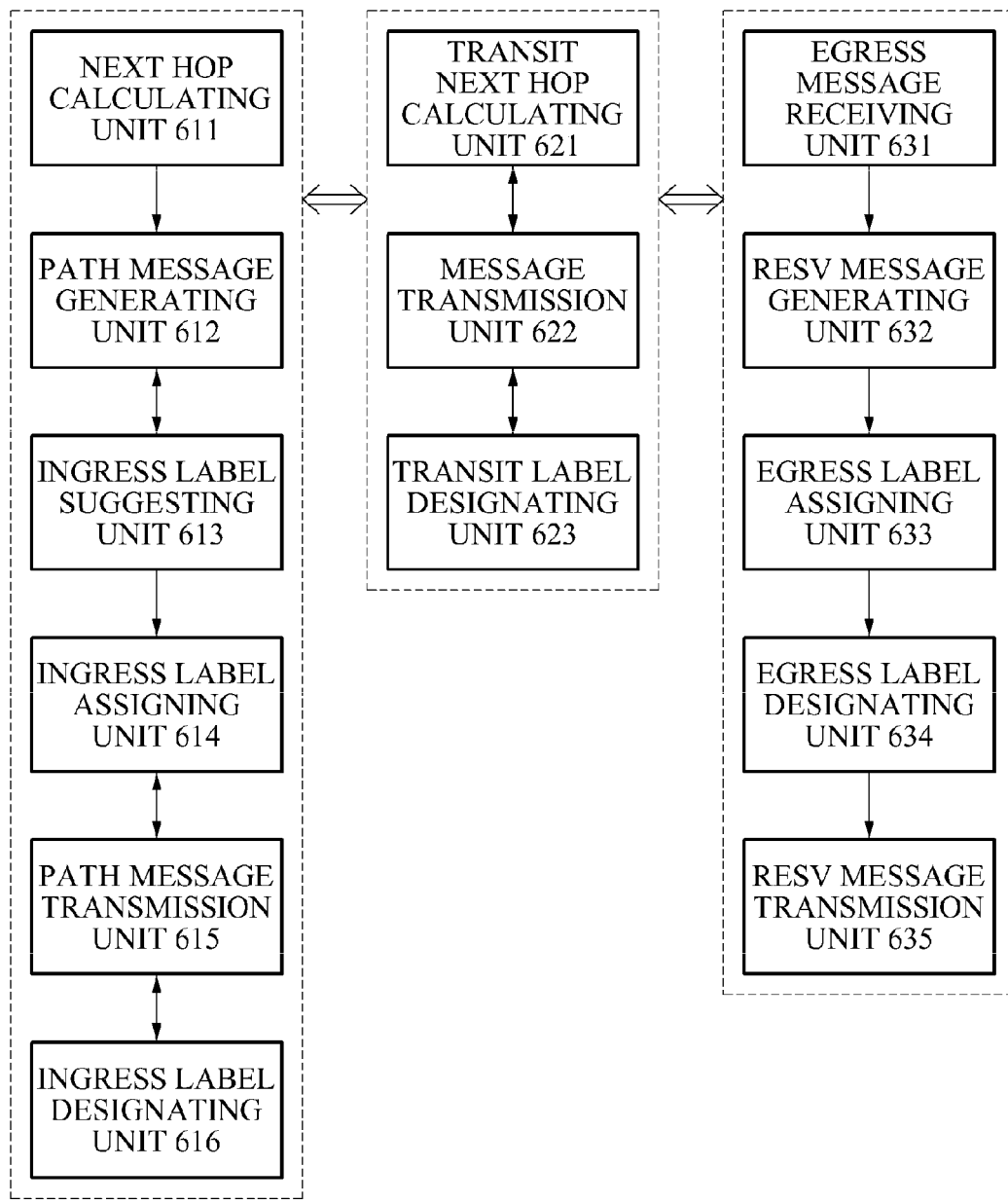
FIG. 6 is a block diagram illustrating a configuration of an apparatus of controlling an LSP of an RSVP-TE protocol according to an embodiment of the present invention.

FIG. 6 is a block diagram illustrating a configuration of an apparatus 600 of controlling an LSP of an RSVP-TE protocol according to an embodiment of the present invention.

Referring to FIG. 6, the apparatus 600 according to an exemplary embodiment may include a next hop calculating unit 611, a Path message generating unit 612, an ingress label suggesting unit 613, an ingress label assigning unit 614, a Path message transmission unit 615, an ingress label designating unit 616, a transit next hop calculating unit 621, a message transmission unit 622, a transit label designating unit 623, an egress message receiving unit 631, an Resv message generating unit 632, an egress label assigning unit 633, an egress label designating unit 634, and an Resv message transmission unit 635.

The next hop calculating unit 611 may be included in the ingress node (A), and calculate a first next hop to obtain information about a next node (B) in accordance with a request for LSP designation from the ingress node (A) to an egress node (D).

The Path message generating unit 612 may be included in the ingress node (A), and generate an RSVP-TE Path message including the egress node (D). The RSVP-TE Path message may include a label request, a generalized label request, an upstream label, and a suggested label object.

When the RSVP-TE Path message includes the suggested label object, the ingress label suggesting unit 613 may suggest a suggested label associated with a downstream LSP to a suggested label object where an available C-type of an End-to-End range is designated. Also, when the RSVP-TE Path message includes the upstream label object, the ingress label assigning unit 614 may assign an upstream label associated with an upstream LSP to an upstream label object where an available C-type of an End-to-End range is designated. Also, when the RSVP-TE Path message includes the generalized label request, the Path message generating unit 612 may generate the RESV-TE Path message including a generalized label request object where an available C-type of an End-to-End range is designated.

The Path message transmission unit 615 may be included in the ingress node (A), and transmit, to the next node (B) obtained from the calculated first next hop, the generated RSVP-TE Path message.

The message transmission unit 622 may be included in transit nodes (B) and (C), and transmit, to a second next node (C) associated with a second next hop being calculated in advance, the transmitted RSVP-TE Path message as is. Here, the transit next hop calculating unit 621 may calculate the second next hop to obtain information about the second next node (C) to which the transmitted RSVP-TE Path message is transmitted.

In this instance, the transit label designating unit 623 may designate, in a forwarding table of a data plane of the upstream label included in the upstream label object, the upstream label. Alternatively, when the suggested label included in the suggested label object is acceptable by the egress node (D), the transit label designating unit 623 may designate, in a forwarding table of a data plane of the transit label designating unit 623, the suggested label.

Also, when the received label object or the received generated label object has the available C-type of the End-to-End, the transit label designating unit 623 may assign the received label as is, and transmit the assigned label to the egress node (D) through the message transmission unit 622.

The egress message receiving unit 631 may be included in the egress node (D), and receive the transmitted RSVP-TE Path message.

The egress message designating unit 634 may be included in the egress node (D), and designate, in a forwarding table of a data plane associated with a downstream LSP, the suggested label included in the received RSVP-TE Path message, as the downstream label when the suggested label is acceptable. Alternatively, when the upstream label included in the received RSVP-TE Path message is acceptable, the egress message designating unit 634 may designate, in a forwarding table of a data plane associated with an upstream LSP, the upstream label.

When the upstream label is required to have availability of the End-to-End range, the egress label assigning unit 633 may assign the label object where the available C-type of the End-to-End is designated or the generated label object.

The Resv message generating unit 632 may be included in the egress node (D), and generate an RSVP-TE Resv message including the designated downstream label.

According to an exemplary embodiment, the egress label assigning unit 633 may be included in the egress node (D), and assign a label based on a switching type, an encoding type, and a payload type included in the received RSVP-TE Path message. In this case, the Resv message generating unit 632 may generate the RSVP-TE Resv message including the assigned label as the downstream label.

The Resv message generating unit 632 may be included in the egress node (D), and transmit the generated RSVP-TE Resv message to the previous node (C).

The ingress label designating unit 616 may receive the RSVP-TE Resv message through the previous node (C), and designate, in a forward table of a data plane of the ingress node (A), the downstream label included in the RSVP-TE Resv message.

The apparatus of FIG. 6 may adopt the method of FIGS. 3 to 5 as is, and thus detailed descriptions thereof will be omitted.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of controlling a Label Switched Path (LSP) of a Resource Reservation Protocol-Traffic Engineering (RSVP-TE) protocol, the method comprising:
   generating an RSVP-TE Path message including an egress node; and
   transmitting, to a next node associated with a first next hop being calculated in advance, the generated RSVP-TE Path message,
   wherein the label is defined to be unique in an End-to-End range.

2. The method of claim 1, wherein the generating of the RSVP-TE Path message includes designating a suggested label associated with a downstream LSP in a suggested label object where an available C-type of an End-to-End range is designated.

3. The method of claim 1, wherein the generating of the RSVP-TE Path message includes designating an upstream label associated with an upstream LSP in an upstream label object where an available C-type of an End-to-End range is designated.

4. The method of claim 1, wherein the generating of the RSVP-TE Path message includes designating a label request object where an available C-type of an End-to-End range is designated.

5. The method of claim 1, wherein the generating of the RSVP-TE Path message comprises:
   enabling a switching type, an encoding type, or a payload type, each associated with a generalized label request, to be included in a generalized label request object; and
   generating the RSVP-TE Path message including the generalized label request object and having an available C-type of an End-to-End range.

6. A method of controlling an LSP of an RSVP-TE protocol, the method comprising:
   receiving an RSVP-TE Path message transmitted from an ingress node through a next node;
   assigning a label based on the received RSVP-TE Path message; and
   transmitting, to the ingress node through the next node, an RSVP-TE Resv message including the assigned label,
   wherein the label is defined to be unique in an End-to-End range.

7. The method of claim 6, wherein, when a suggested label included in the received RSVP-TE Path message is acceptable, further comprises designating the suggested label in a forwarding table of a data plane associated with an upstream LSP.

8. The method of claim 6, wherein, when an upstream label included in the received RSVP-TE Path message is acceptable, further comprises designating the upstream label in a forwarding table of a data plane associated with an upstream LSP.

9. The method of claim 6, wherein the assigning of the label comprises:
   assigning the label based on a switching type, an encoding type, or a payload type, in accordance with a generalized label request included in the received RSVP-TE Path message; and
   assigning the assigned label to a generalized label object having an available C-type of an End-to-End range.

10. An apparatus of controlling an LSP of an RSVP-TE protocol, the apparatus comprising:
    a next hop calculating unit to calculate a first next hop;
    a Path message generating unit to generate an RSVP-TE Path message including an egress node; and
    an Path message transmission unit to transmit, to a next node associated with the calculated first next hop, the generated RSVP-TE Path message,
    wherein the label is defined to be unique in an End-to-End range.

11. The apparatus of claim 10, further comprising:
    an ingress label suggesting unit to suggest, to a suggested label object where an available C-type of End-to-End range is designated, a suggested label associated with a downstream LSP.

12. The apparatus of claim 10, further comprising:
    an ingress label assigning unit to assign, to an upstream label object where an available C-type of an End-to-End range is designated, an upstream label associated with an upstream LSP.

13. An apparatus of controlling an LSP of an RSVP-TE protocol, the apparatus comprising:
    an egress message receiving unit to receive an RSVP-TE Path message transmitted from an ingress node through a next node;
    an egress label assigning unit to assign a label based on the received RSVP-TE Path message; and
    an Resv message transmission unit to transmit, to the ingress node through the next node, an RSVP-TE Resv message including the assigned label,
    wherein the label is defined to be unique in an End-to-End range.

14. The apparatus of claim 13, further comprising:
    an egress label designating unit to designate a suggested label in a forwarding table of a data plane associated with a downstream LSP, when the suggested label is acceptable, the suggested label being included in the received RSVP-TE Path message.

15. The apparatus of claim 13, further comprising:
    an egress label designating unit to designate an upstream label in a forwarding table of a data plane associated with an upstream LSP, when the upstream label is acceptable, the upstream label being included in the received RSVP-TE Path message.

16. The apparatus of claim 13, the egress label assigning unit assigns the label based on a switching type, an encoding type, or a payload type in accordance with a generalized label request, and assigns the assigned label to a generalized label object having an available C-type of an End-to-End range.

* * * * *